Jan. 15, 1929.
J. E. RAVLIN
1,699,406
GUIDE FOR AUTOMOBILE JACKS
Filed March 3, 1927
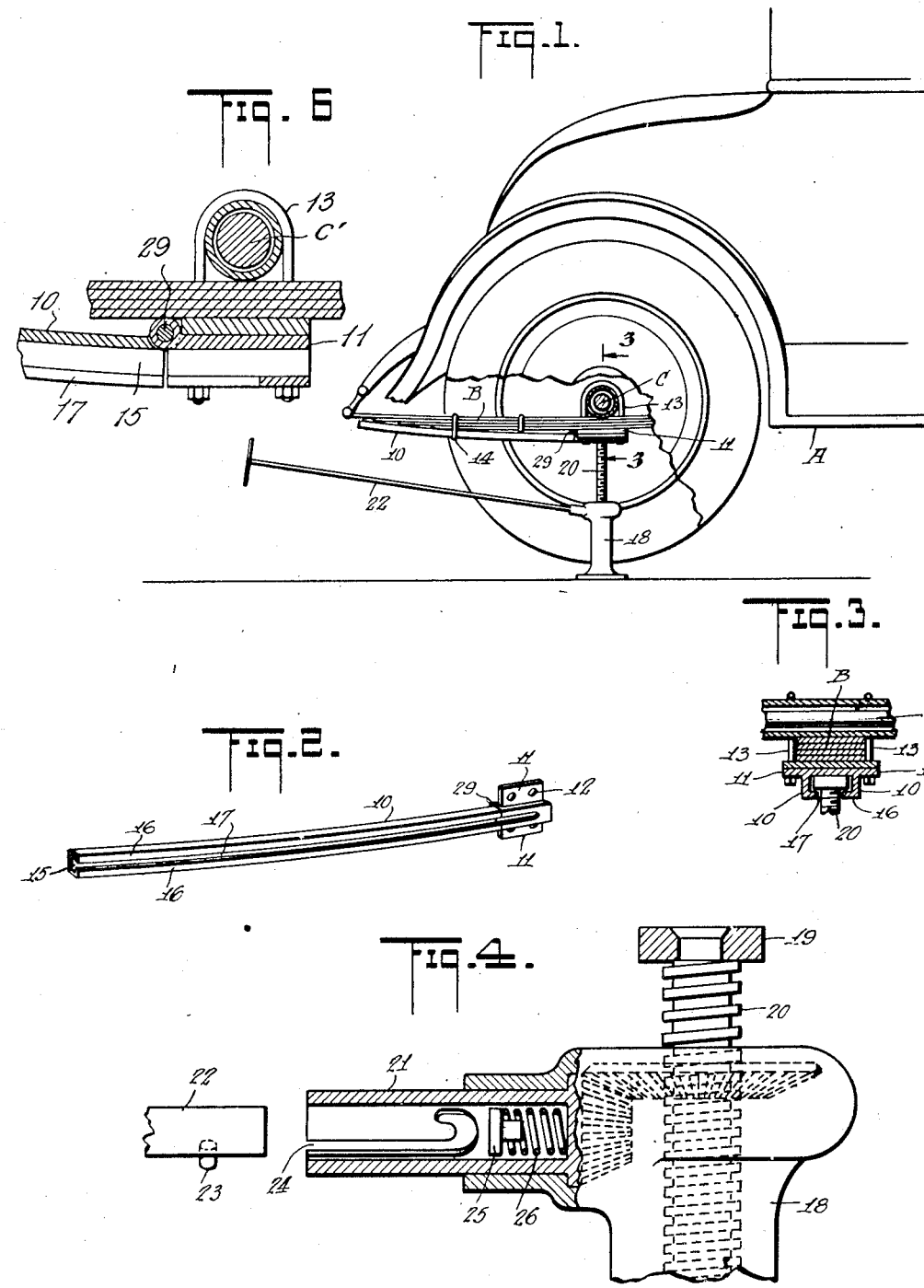
INVENTOR
John E. Ravlin.
BY
Munn & Co.
ATTORNEY Patented Jan. 15, 1929.

1,699,406

UNITED STATES PATENT OFFICE.

JOHN E. RAVLIN, OF MIAMI, FLORIDA.

GUIDE FOR AUTOMOBILE JACKS.

Application filed March 3, 1927. Serial No. 172,439.

My invention relates to automobile jacks and has in view the placing of the jack properly in position beneath the axle.

The general object of my invention is to provide a guide by means of which the jack may be guided to the jacking position without the operator of the jack going beneath the automobile.

A further object of the invention is to provide for guiding the jack to position while employing the operating handle of the jack for moving the jack.

The manner and means whereby the above and other objects are attained will clearly appear as the description proceeds.

Reference is to be had to the accompanying drawings forming a part of this specification, it being understood that the drawings are merely illustrative of two examples of the invention.

Figure 1 is a side elevation of a jack and guide therefor embodying my invention, showing the same in position beneath the axle of an automobile shown in section.

Figure 2 is a perspective view of the guide in one form of the invention.

Figure 3 is a detail in transverse vertical section as indicated by the line 3—3 of Figure 1.

Figure 4 is an enlarged view partly in elevation and partly in vertical section showing a slot for engaging the operating handle and showing adjacent parts, as well as a fragment of the operating handle.

Figure 5 is a perspective view of the jack guide in another form.

Figure 6 is an enlarged vertical sectional detail view of the hinge.

In Figure 1 the letter A indicates a portion of an automobile, B the automobile side spring and C an axle.

My improved guide in the form shown in Figures 1 to 3 consists of an elongated bar 10 which has at one end lateral flanges 11 formed with holes 12 to receive bolts 13 or the like for fastening the guide 10 at that end, beneath the axle C. Distant from the flanged end of the guide 10 the same is secured by a clip or shackle 14 to the spring B.

The guide 10 is formed with a longitudinal slot 15 open at one end and terminating adjacent the flanges 11. Said slot 15 is formed T-shaped, in viewing the cross-section of the guide 10, the T form being produced by forming flanges 16 at the bottom of the slot, leaving a narrow slot 17 at the bottom of the main slot 15.

The jack 18 which is of known form in general has a swivel head 19 at the top of the screw 20 and said head 19 is formed to be accommodated in the slot 15, the screw 20 having clearance in the narrow portion 17 of the slot. At one side of the jack 18 is a lateral tube 21 to accommodate the forward end of the operating rod or handle 22. Said operating handle 22 has a lateral stud 23 which is adapted to be entered in a bayonet slot 24 in the tube 21. Within the tube 21 inward of the bayonet slot 24 is a bearing head 25 against which the front end of the handle bar 22 will contact when it reaches the end of the slot 24. Said bearing head 25 is yieldingly held by a coiled spring 26 which yields as the end of the bar 22 engages the bearing head 25 and thereby causes the rod 22 to be held against accidental displacement with its stud 23 in engagement with the end of the slot 24.

With the described arrangement and with the guide 10 secured to the automobile beneath the spring and axle the jack head 19 may be entered in the slot 15. The handle 22 having been engaged with the slot 24, said rod may be turned to operate the gears of the jack for raising and lowering the screw 20. The jack is moved through the medium of the handle 22 along the guide 10 until the jack is positioned beneath the axle to be jacked up.

In the form shown in Figure 5 the guide 110 has an angle flange 111 at one end to be secured by bolts beneath the axle C as in the first instance, and at the opposite end is a block 27 or its equivalent having holes 28 to receive bolts or shackles, there being similar holes 112 in the angle flange 111. The guide 110 has a groove 115 corresponding with the groove 15 and produced by flanges 116 as in the form shown best in Figure 2, to leave a narrow slot 117 for affording clearance for the jack screw 20. Thus both ends of the guide 110 are firmly held to the spring and axle of the automobile.

It will be obvious that with the described device the jack may be placed in position without the operator going beneath the automobile.

Guide 10 and guide 110 are each resilient. Also in each a hinge is provided indicated at 29 in Figures 1 and 2 and indicated at 110

129 in Figure 5. The hinge permits pivotal movement of the guide 10 or 110 on the upward movement of the spring B in the event of a shock and on the downward movement there is no pivotal movement at the hinge. Therefore, the bar 10 or 110 will flex and reinforce the spring B forming additional resistance in the reaction to the shock.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claim.

What I claim is:

A guide for automobile jacks consisting of a spring bar having a hinge thereon and having means to receive the head of a jack to guide said jack along said bar.

JOHN E. RAVLIN